US010514092B2

(12) United States Patent
Craft et al.

(10) Patent No.: US 10,514,092 B2
(45) Date of Patent: Dec. 24, 2019

(54) POSITION SENSOR BODY ASSEMBLY

(71) Applicant: Eaton Corporation, Cleveland, OH (US)

(72) Inventors: Robert B. Craft, Ceresco, MI (US); Christopher Robert Knapp, Mattawan, MI (US); Patrick Martin Fergus, Gobles, MI (US)

(73) Assignee: Eaton Corporation, Cleveland, OH (US)

( * ) Notice: Subject to any disclaimer, the term of this patent is extended or adjusted under 35 U.S.C. 154(b) by 167 days.

(21) Appl. No.: 15/845,584

(22) Filed: Dec. 18, 2017

(65) Prior Publication Data

US 2018/0172141 A1 Jun. 21, 2018

Related U.S. Application Data

(60) Provisional application No. 62/436,118, filed on Dec. 19, 2016.

(51) Int. Cl.
*G01M 13/02* (2019.01)
*F16H 61/00* (2006.01)
*G01D 5/00* (2006.01)
*F16H 59/68* (2006.01)

(52) U.S. Cl.
CPC ......... *F16H 61/0006* (2013.01); *F16H 59/68* (2013.01); *G01D 5/00* (2013.01)

(58) Field of Classification Search
USPC .......................................... 73/114.77, 115.02
See application file for complete search history.

(56) References Cited

U.S. PATENT DOCUMENTS

| 5,332,965 | A |   | 7/1994 | Wolf et al. |
| 5,698,778 | A |   | 12/1997 | Ban et al. |
| 5,798,639 | A |   | 8/1998 | McCurley et al. |
| 5,818,223 | A | * | 10/1998 | Wolf ............... F02D 11/106 324/207.12 |
| 5,828,290 | A | * | 10/1998 | Buss ............... G01B 21/02 338/162 |
| 6,188,216 | B1 |   | 2/2001 | Fromer |
| 6,194,894 | B1 |   | 2/2001 | Apel et al. |
| 6,198,275 | B1 |   | 3/2001 | Wolf et al. |
| 6,244,296 | B1 |   | 6/2001 | Lafler et al. |
| 6,472,865 | B1 |   | 10/2002 | Tola et al. |
| 6,658,960 | B2 |   | 12/2003 | Babin et al. |
| 8,823,366 | B2 |   | 9/2014 | Babin |

(Continued)

*Primary Examiner* — Eric S. McCall
(74) *Attorney, Agent, or Firm* — RMCK Law Group PLC

(57) ABSTRACT

A transmission position sensor body assembly configured to be securely attached to a transmission housing includes a sensor body housing, a cap member and compression limiters. The sensor body housing has a central rim and a pair of outer receiving lobes that define a corresponding pair of bores. The cap member has a central body portion including integrally formed outer ears extending therefrom. The cam member is coupled to the sensor body. The compression limiters are coupled to the cap member at the respective outer ears and that extend through the bores of the sensor body housing. Fasteners are received through respective compression limiters. Clamping forces are transferred onto the cap member during the tightening of the fasteners to the transmission housing without acting on the sensor body housing.

20 Claims, 6 Drawing Sheets

(56) References Cited

U.S. PATENT DOCUMENTS

| | | | | |
|---|---|---|---|---|
| 2003/0056614 A1* | 3/2003 | Babin | ............... | F16H 59/105 |
| | | | | 74/473.28 |
| 2003/0159534 A1* | 8/2003 | Babin | ............... | F16H 59/105 |
| | | | | 74/473.12 |
| 2005/0183695 A1* | 8/2005 | Keefover | ............ | F02D 9/1065 |
| | | | | 123/399 |
| 2006/0220285 A1* | 10/2006 | Urquidi | ............... | B60G 7/02 |
| | | | | 267/140.12 |
| 2010/0308802 A1* | 12/2010 | Guibet | ............... | B03C 1/286 |
| | | | | 324/207.11 |
| 2011/0234208 A1* | 9/2011 | Hofmockel | ......... | F02D 11/106 |
| | | | | 324/207.2 |
| 2015/0377193 A1* | 12/2015 | Smith | ............ | F02M 35/10249 |
| | | | | 123/184.21 |
| 2018/0023981 A1* | 1/2018 | Forwerck | ........... | B60R 16/0231 |
| | | | | 73/866.5 |
| 2019/0154470 A1* | 5/2019 | Pusheck | ............... | G01D 11/30 |

\* cited by examiner

US 10,514,092 B2

POSITION SENSOR BODY ASSEMBLY

CROSS-REFERENCE TO RELATED APPLICATIONS

This application is a claims priority to U.S. Provisional Application No. 62/436,118 filed on Dec. 19, 2016. This application is incorporated by reference in its entirety as if set forth herein.

FIELD

The present disclosure relates to a position sensor body assembly of a vehicle transmission.

BACKGROUND

Transmissions, such as vehicle transmissions, have one or more gear meshes that selectively transfer torque from an input shaft to an output shaft of the transmission. Such transmissions include fully automatic and semi-automatic transmission systems and fully or partially automated shift implementation systems that utilize electronic controls. These transmissions typically include many sensors for sensing an operating condition and communicating same to a controller. One sensor is an X-Y position sensor that is configured to sense discrete X-Y positions of a transmission shift member.

SUMMARY

A transmission position sensor body assembly configured to be securely attached to a transmission housing includes a sensor body housing, a cap member and compression limiters. The sensor body housing has a central rim and a pair of outer receiving lobes that define a corresponding pair of bores. The cap member has a central body portion including integrally formed outer ears extending therefrom. The cam member is coupled to the sensor body. The compression limiters are coupled to the cap member at the respective outer ears and that extend through the bores of the sensor body housing. Fasteners are received through respective compression limiters. Clamping forces are transferred onto the cap member during the tightening of the fasteners to the transmission housing without acting on the sensor body housing.

According to additional features, an O-ring is positioned between the cap member and the transmission housing that forms a seal between the cap member and the transmission housing. The compression limiters can be over-molded to the cap member. In another example, the compression limiters can be pressed into the cap member. The cap member and the sensor body are coupled together by a laser weld. The cap member further includes a recessed center section having an outer boundary defined by an outer lip and an inner boundary defined by a raised central wall. The outer lip extends to a common plane as the outer ears. The sensor body further comprises an electrical connector. The pair of bores in the sensor body housing have inner diameters that are greater than corresponding outer diameter of the compression limiters such that the compression limiters float within the respective bores. The sensor body housing and the cap member can be formed of rigid plastic. The compression limiters can be formed of metal.

A transmission position sensor body assembly configured to be securely attached to a transmission housing and constructed in accordance to another example of the present disclosure includes a sensor body housing, a cap member, compression limiters and an O-ring. The sensor body has a central rim and a pair of outer receiving lobes. The cap member has a central body portion including integrally formed outer ears extending therefrom. The cap member includes a recessed center section having an outer boundary defined by an outer lip and an inner boundary defined by a raised central wall. The cap member is coupled to the sensor body. The compression limiters are coupled to the cap member at the respective outer ears. The O-ring is configured to be received at the recessed center section and form a seal between the cap member and the transmission housing.

In other features, the compression limiters can be over-molded to the cap member. In another arrangement, the compression limiters can be pressed into the cap member. The cap member and the sensor body can be coupled together by a laser weld. The outer lip can extend to a common plane as the outer ears. The sensor body housing can further include an electrical connector. The outer ears can define respective bores therein. The bores can be configured to receive the compression limiters. The compression limiters can float within the respective bores. The fasteners can be received through the respective compression limiters. Clamping forces can be transferred onto the cap member during tightening of the fasteners to the transmission housing. The laser weld can be a face weld.

DETAILED DESCRIPTION

Figure 1:
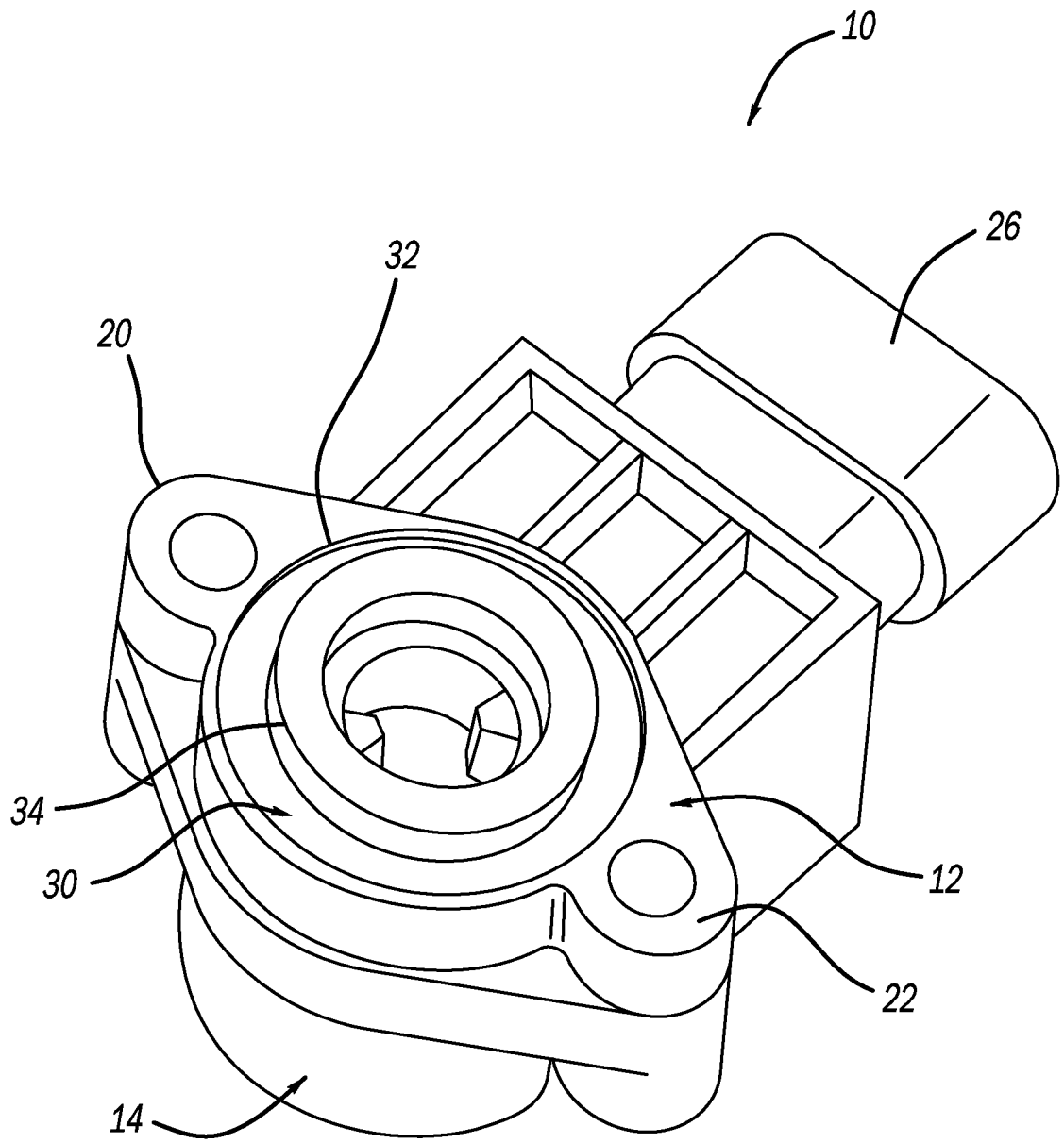
FIG. 1 is a top perspective view of a transmission position sensor body assembly constructed in accordance to one example of Prior Art.

The illustrated examples are disclosed with reference to the drawings. However, it is to be understood that the disclosed examples are intended to be merely examples that may be embodied in various and alternative forms. The FIGS. are not necessarily to scale and some features may be exaggerated or minimized to show details of particular components. The specific structural and functional details disclosed are not to be interpreted as limiting, but as a representative basis for teaching one skilled in the art how to practice the disclosed concepts. Moreover, while the following discussion is specific to an X-Y position sensor of a transmission, the same may be applied to other sensors of a transmission or other sensors in general that may require mounting to a housing while having a sealing member therebetween.

With initial reference to FIGS. 1-4, a transmission position sensor body assembly constructed in accordance to one example of Prior Art is shown and generally identified at reference numeral 10. The transmission position sensor body assembly 10 includes an inner body portion 12, an outer body portion 14, ears or compression limiters 20, 22 and an electrical connector 26. The inner body 12 can include a recessed center section 30 having an outer boundary defined by an outer lip 32 and an inner boundary defined by a raised central rim 34. In one configuration, the compression limiters 20, 22 are part of the outer body portion 14. As discussed herein, the inner body 12 is coupled by laser welding to the outer body portion 14.

When the transmission position sensor body assembly 10 is coupled to a transmission housing 38, fasteners 40, 42 locate through the respective compression limiters 20, 22 and threadably mate with bores 46, 48 defined in the transmission housing 38. A gasket 50 is positioned between the transmission housing 38 and the position sensor body assembly 10. Specifically, a first side of the gasket 50 sealingly engages a face 54 of the transmission housing 38 while a second side of the gasket 50 radially spans from the recessed center section 30, over the outer lip 32 and to the compression limiters 20, 22 (see FIG. 2).

Figure 2:
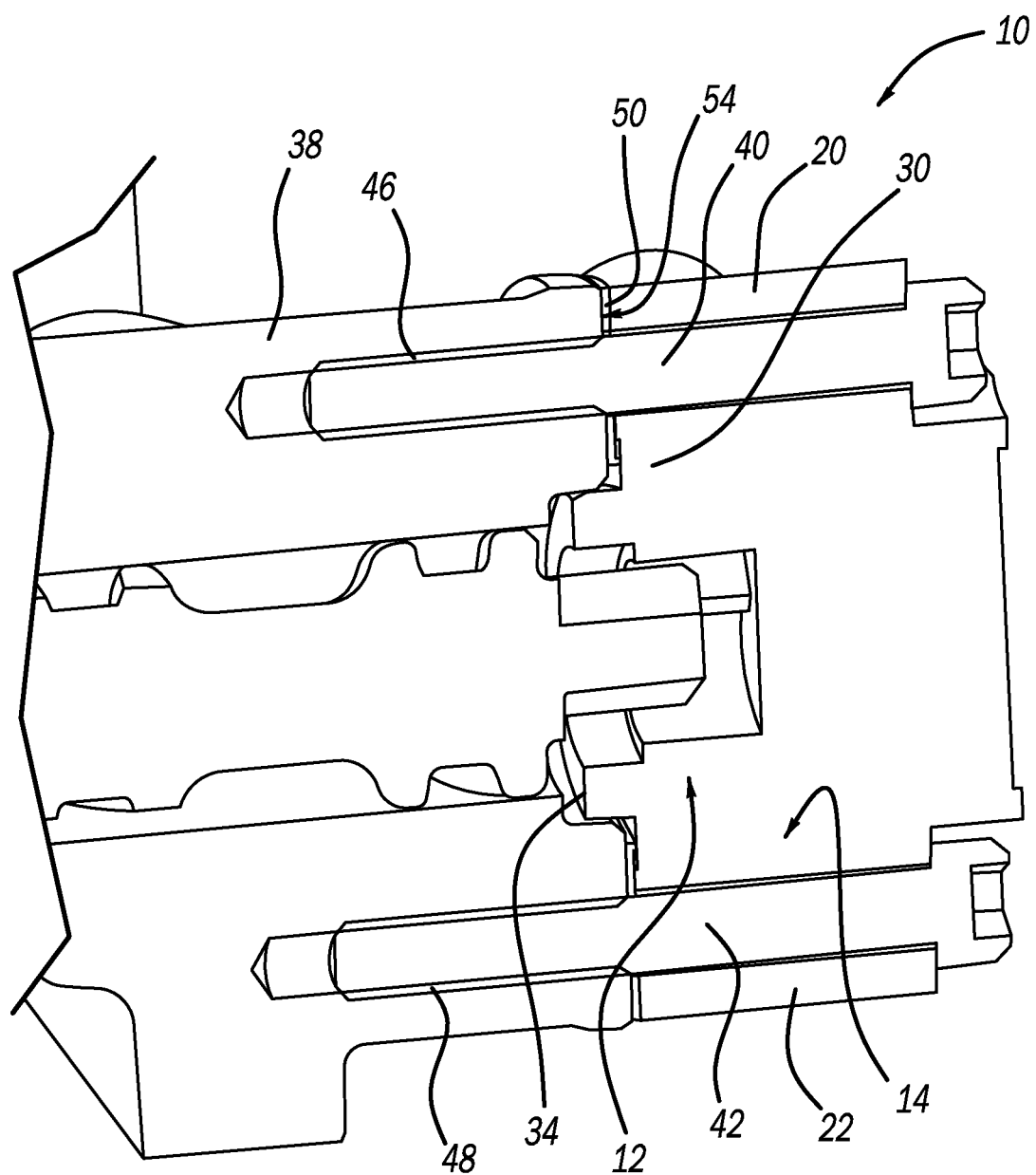
FIG. 2 is a sectional view of the transmission position sensor body assembly of FIG. 1 and shown coupled to a transmission housing with fasteners and a gasket according to Prior Art.
Figure 3:
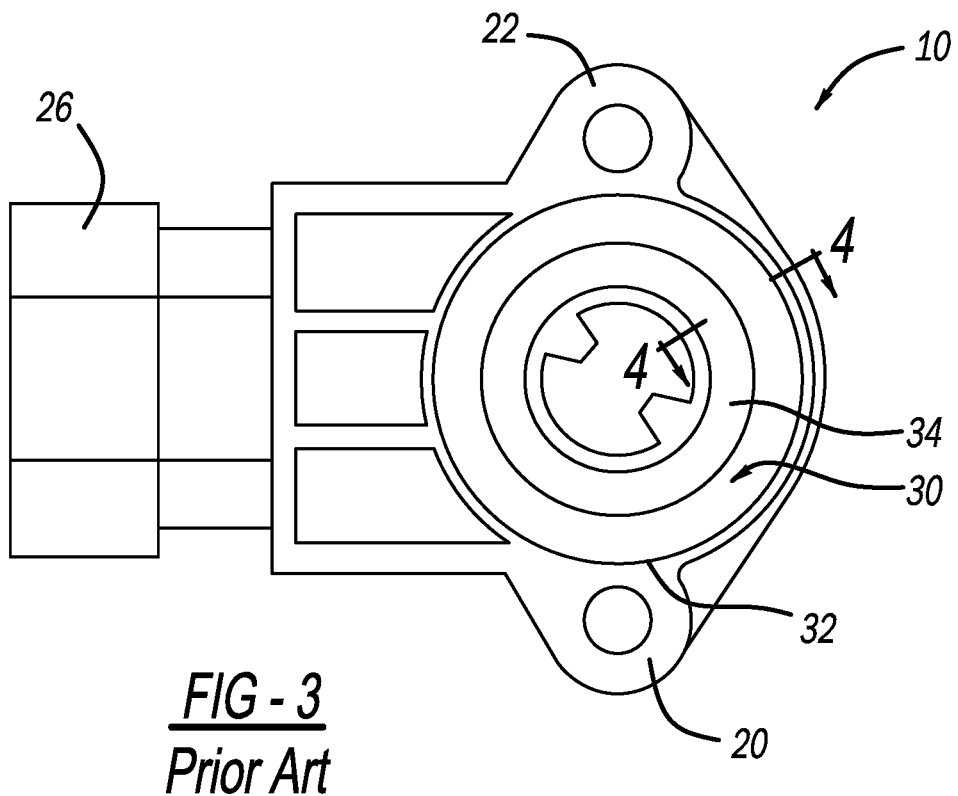
FIG. 3 is a plan view of the transmission position sensor body assembly of FIG. 1 according to Prior Art.
Figure 4:
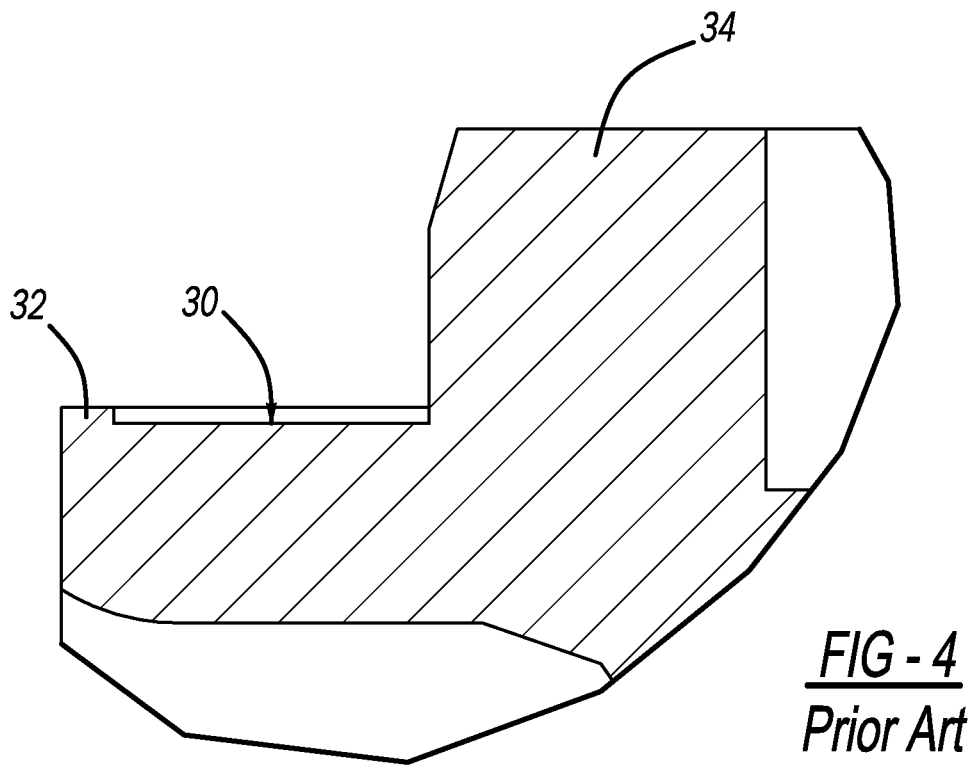
FIG. 4 is a cross section taken along line 4-4 of the transmission position sensor body assembly of FIG. 3 according to Prior Art.

The inner body portion 12 and recessed center section 30 of the position sensor body assembly 10 is laser welded to the outer body 14 into the final shape shown in FIGS. 1 and 2. When laser welding plastic parts together some of the material melts making it difficult to hold tolerances and specifically, it is difficult to locate the recessed center section 30 on a common plane as the compression limiters 20, 22 creating an inability to consistently clamp the gasket 50. Explained further, while clamping forces may be directed onto the outer body 14 at the compression limiters 20, 22, the same clamping forces may not necessarily be transferred onto the inner body 12. As a result it is difficult to achieve a satisfactory seal with the gasket 50 at the recessed center section 30. Sometimes an unsatisfactory laser weld can lead to an oil leak path outside of the sealing portion of the gasket 50. Moreover, as the compression limiters 20, 22 are molded into the outer body 14, there is minimal retention capacity. When the fasteners 40, 42 were tightened to attempt to gain an improved clamping force between the position sensor body assembly 10 and the transmission housing 38, the compression limiters 20, 22 tend to be pushed out of the outer body portion 14. In other words, significant loads are experienced by the compression limiters 20, 22 but the load does not transfer effectively to the inner body 12 of the position sensor body assembly 10 and properly contribute to an improved seal with the gasket 50.

Figure 5:
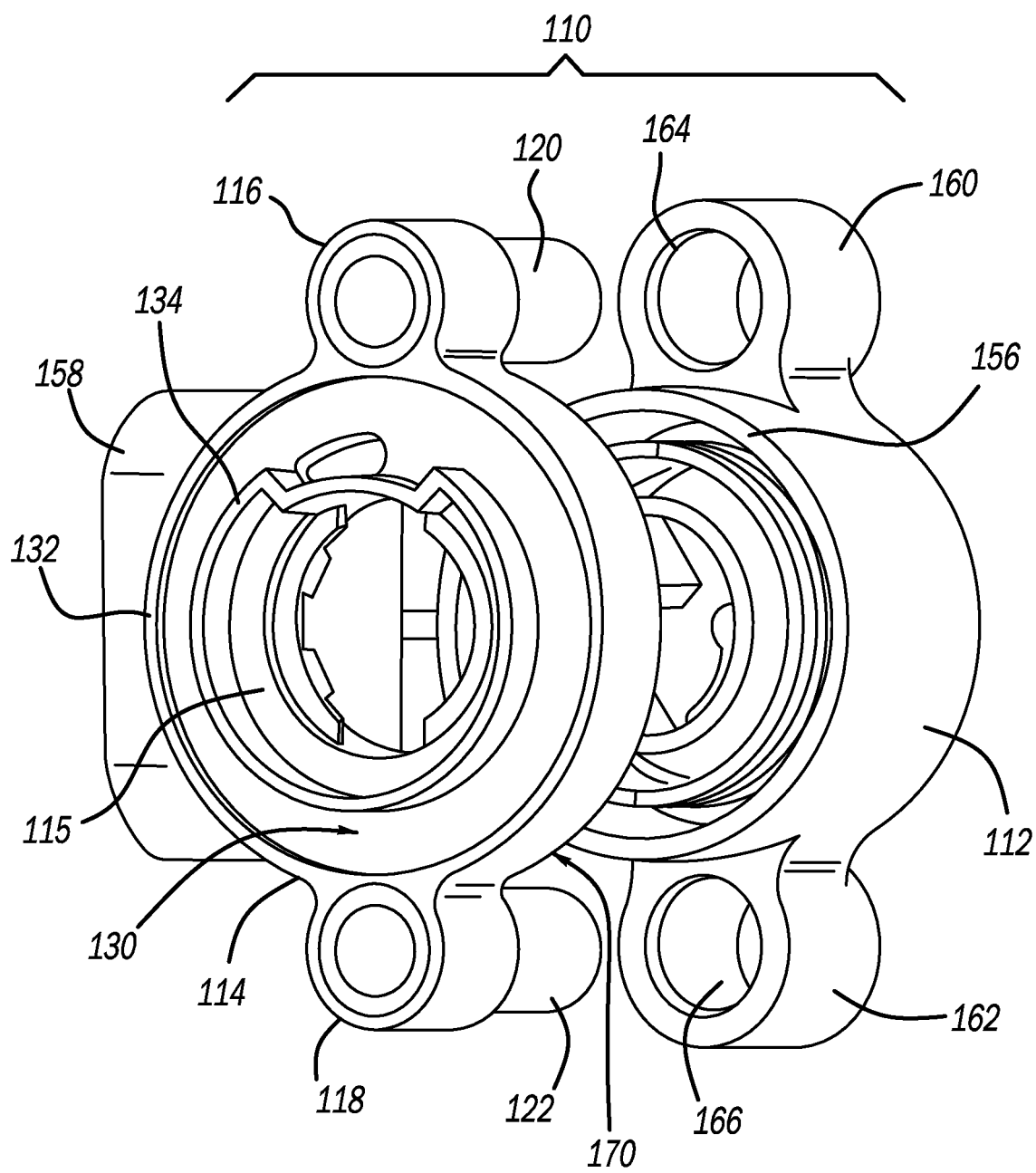
FIG. 5 is an exploded perspective view of a transmission position sensor body assembly constructed in accordance to one example of the present disclosure and shown prior to joining of a cap member and a sensor body housing.
Figure 6:
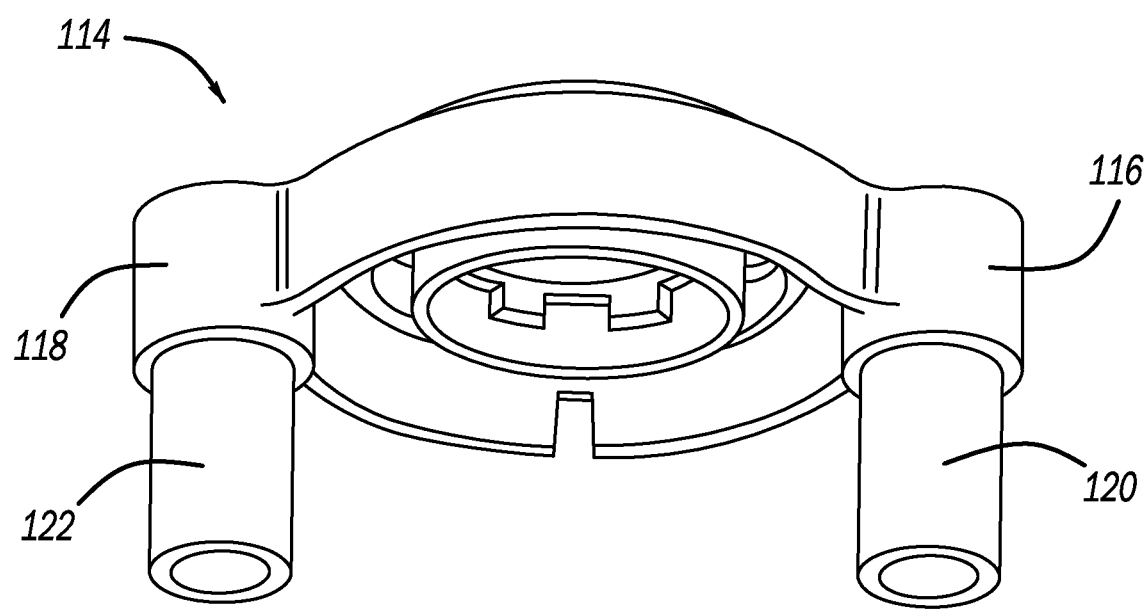
FIG. 6 is a side perspective view of the cap member of FIG. 5.
Figure 7:
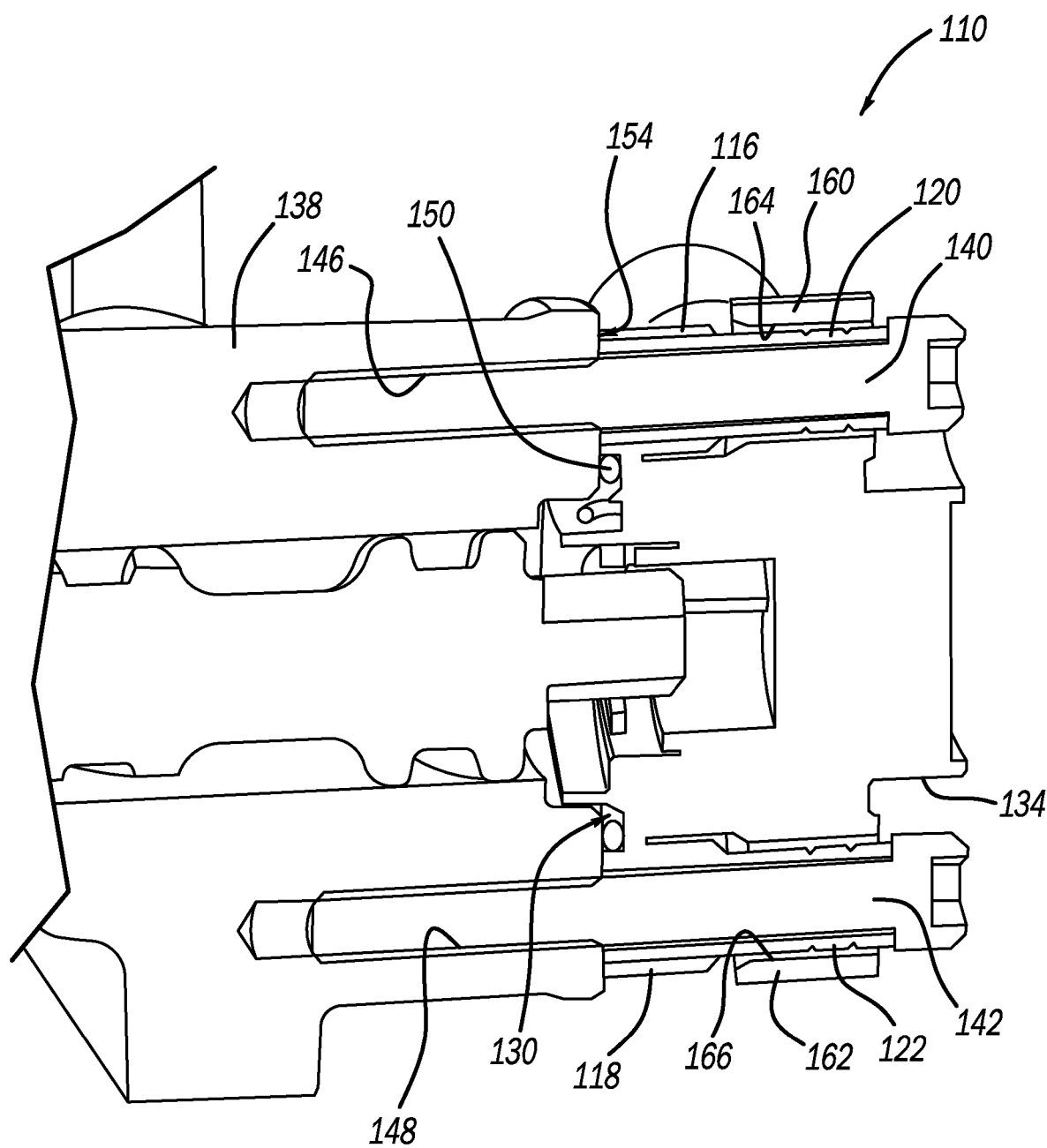
FIG. 7 is a sectional view of the transmission position sensor body assembly of FIG. 5 and shown coupled to a transmission housing with fasteners and an O-ring.

With reference now to FIGS. 5-7, a transmission position sensor body assembly constructed in accordance to one example of the present disclosure is shown and generally identified at reference 110. The transmission position sensor body assembly 10 generally includes a sensor body housing 112 and a cap member 114. The sensor body housing 112 and the cap member 114 can be formed of rigid plastic. The cap member 114 includes a central body portion 115 having integrally formed outer ears 116, 118 extending oppositely therefrom. Compression limiters 120, 122 are coupled to the cap member 114 at the outer ears 116, 118 respectively. The compression limiters 120, 122 can be over-molded or pressed into the outer ears 16, 118, respectively.

In one example the compression limiters 120, 122 are formed of a rigid material such as metal. The cap member 114 further includes a recessed center section 130 having an outer boundary defined by an outer lip 132 and an inner boundary defined by a raised central wall 134. Notably, the outer lip 132 extends to a common plane as the outer ears 116, 118.

When the transmission sensor body assembly 110 is coupled to a transmission housing 138 (FIG. 7), the fasteners 140, 142 locate through the respective compression limiters 120, 122 and threadably mate with bores 146, 148 defined in the transmission housing 138. An O-ring 150 is positioned between the transmission housing 138 and the position sensor body assembly 110. Specifically, the O-ring 150 locates at the recessed center section 130 and is radially bound by the outer lip 132 and the raised central wall 134. In an assembled position (FIG. 7), the O-ring 150 engages a mounting surface 154 of the transmission housing 138.

The sensor body housing 112 includes a central rim 156, an electrical connector 158 and outer receiving lobes 160, 162 having bores 164, 166 respectively. The bores 164 and 166 are configured to receive the compression limiters 120, 122 (see FIG. 7). The cap member 114 can be coupled to the sensor body housing 112 such as by laser welding. The laser weld can be applied as a face weld generally to a rear surface 170 of the cap member 114 away from the recessed central section 130. The laser weld area is independent of the sealing area at the recessed center section 130. The central rim 156 is recessed into the cap member 114 subsequent to laser welding.

When the fasteners 140, 142 are torqued down on the compression limiters 120, 122 while the fasteners 140, 142 are tightened into the bores 146, 148 defined in the transmission housing 138, the clamping forces are transferred onto the cap member 114. The bores 164, 166 define an inner diameter that is greater than the outer diameter of the corresponding fasteners 140, 142. The compression limiters 120, 122 therefore float within the bores 164, 166. The clamping forces of the fasteners 140, 142 act upon the compression limiters 120, 122 and consequently upon the mounting surface 154 of the transmission housing 138. The compression limiters 120, 122 therefore do not act upon the sensor body housing 112 while coupling the position sensor body assembly 110 to the transmission housing 138. In this regard, the clamping forces can be transferred onto the O-ring 150 to achieve a successful seal with the mounting surface 154 of the transmission housing 138. The O-ring 150 therefore can attain a more robust seal with the transmission housing 138 as compared to the Prior Art gasket example described above.

The examples described above are specific examples that do not describe all possible forms of the disclosure. The features of the illustrated examples may be combined to form further examples of the disclosed concepts. The words used in the specification are words of description rather than limitation. The scope of the following claims is broader than the specifically disclosed examples and also includes modifications of the illustrated examples.

The invention claimed is:

1. A transmission position sensor body assembly configured to be securably attached to a transmission housing, the transmission position sensor body assembly comprising:
   a sensor body housing having a central rim and a pair of outer receiving lobes that define a corresponding pair of bores;

a cap member having a central body portion including integrally formed outer ears extending therefrom, the cap member being coupled to the sensor body;

compression limiters coupled to the cap member at the respective outer ears and that extend through the bores of the sensor body housing; and wherein fasteners are received through the respective compression limiters and wherein clamping forces are transferred onto the cap member during tightening of the fasteners to the transmission housing without acting on the sensor body housing.

2. The transmission position sensor body assembly of claim 1, further comprising:

an O-ring positioned between the cap member and the transmission housing and that forms a seal between the cap member and the transmission housing.

3. The transmission position sensor body assembly of claim 1 wherein the compression limiters are over-molded to the cap member.

4. The transmission position sensor body assembly of claim 1 wherein the compression limiters are pressed into the cap member.

5. The transmission position sensor body assembly of claim 1 wherein the cap member and the sensor body are coupled together by a laser weld.

6. The transmission position sensor body assembly of claim 1 wherein the sensor body housing further comprises an electrical connector.

7. The transmission position sensor body assembly of claim 1 wherein the pair of bores in the sensor body housing have inner diameters that are greater than corresponding outer diameters of the compression limiters such that the compression limiters float within the respective bores.

8. The transmission position sensor body assembly of claim 1 wherein the sensor body housing and the cap member are formed of rigid plastic and the compression limiters are formed of metal.

9. The transmission position sensor body assembly of claim 1 wherein the cap member further includes a recessed center section having an outer boundary defined by an outer lip and an inner boundary defined by a raised central wall.

10. The transmission position sensor body assembly of claim 9 wherein the outer lip extends to a common plane as the outer ears.

11. A transmission position sensor body assembly configured to be securably attached to a transmission housing, the transmission position sensor body assembly comprising:

a sensor body housing having a central rim and a pair of outer receiving lobes;

a cap member having a central body portion including integrally formed outer ears extending therefrom, the cap member including a recessed center section having an outer boundary defined by an outer lip and an inner boundary defined by a raised central wall, the cap member being coupled to the sensor body;

compression limiters coupled to the cap member at the respective outer ears; and an O-ring configured to be received at the recessed center section and form a seal between the cap member and the transmission housing.

12. The transmission position sensor body assembly of claim 11 wherein the compression limiters are over-molded to the cap member.

13. The transmission position sensor body assembly of claim 11 wherein the compression limiters are pressed into the cap member.

14. The transmission position sensor body assembly of claim 11 wherein the outer lip extends to a common plane as the outer ears.

15. The transmission position sensor body assembly of claim 11 wherein the sensor body housing further comprises an electrical connector.

16. The transmission position sensor body assembly of claim 11 wherein the cap member and the sensor body are coupled together by a laser weld.

17. The transmission position sensor body assembly of claim 16 wherein the laser weld is a face weld.

18. The transmission position sensor body assembly of claim 11 wherein the outer ears define respective bores therein, the bores configured to receive the compression limiters.

19. The transmission position sensor body assembly of claim 18 wherein the compression limiters float within the respective bores.

20. The transmission position sensor body assembly of claim 19 wherein fasteners are received through the respective compression limiters and wherein clamping forces are transferred onto the cap member during tightening of the fasteners to the transmission housing.

\* \* \* \* \*